United States Patent [19]

Cook

[11] 4,081,216
[45] Mar. 28, 1978

[54] ULTRASONIC TRANSDUCER CALIBRATION

[75] Inventor: Bill D. Cook, Houston, Tex.

[73] Assignee: The United States of America as represented by the Department of Health, Education and Welfare, Washington, D.C.

[21] Appl. No.: 699,996

[22] Filed: Jun. 25, 1976

[51] Int. Cl.² ............................................. G02F 1/11
[52] U.S. Cl. ................................. 356/256; 350/358
[58] Field of Search ................... 356/256; 350/161 W; 73/71.3, 67.5 R

[56] References Cited

U.S. PATENT DOCUMENTS 2,515,054  7/1950  Pagliarulo ................. 350/161 W X

OTHER PUBLICATIONS

Richardson, Ultrasonic Physics, pp. 158–163, Elsevier Pub. Co., 1952.

*Primary Examiner*—John K. Corbin
*Assistant Examiner*—Matthew W. Koren
*Attorney, Agent, or Firm*—John S. Roberts, Jr.; Norman J. Latker; Thomas G. Ferris

[57] ABSTRACT

An acousto-optical method and device for measuring the radiation produced by a transducer is described wherein such radiation is in the range of about 500 KHz to 10 MHz. The method consists of propagating ultrasound frequencies from the transducer through a transparent liquid medium in a cell, said cell having a transparent window or suitable device to provide a clear path for the radiation waves and passing a light through said cell at about a right angle to the direction of said ultrasound wherein the light is modulated in phase with the frequency of the ultrasound. The modulation of the light corresponding to the frequency of the ultrasound can be detected by a photo-cell measured and displayed on various devices. Further, a transducer can be calibrated absolutely using this method and apparatus from known constants and easily measured quantities. Moreover, it is readily adapted to measure the radiation of an unknown source to a known absolute source.

11 Claims, 1 Drawing Figure

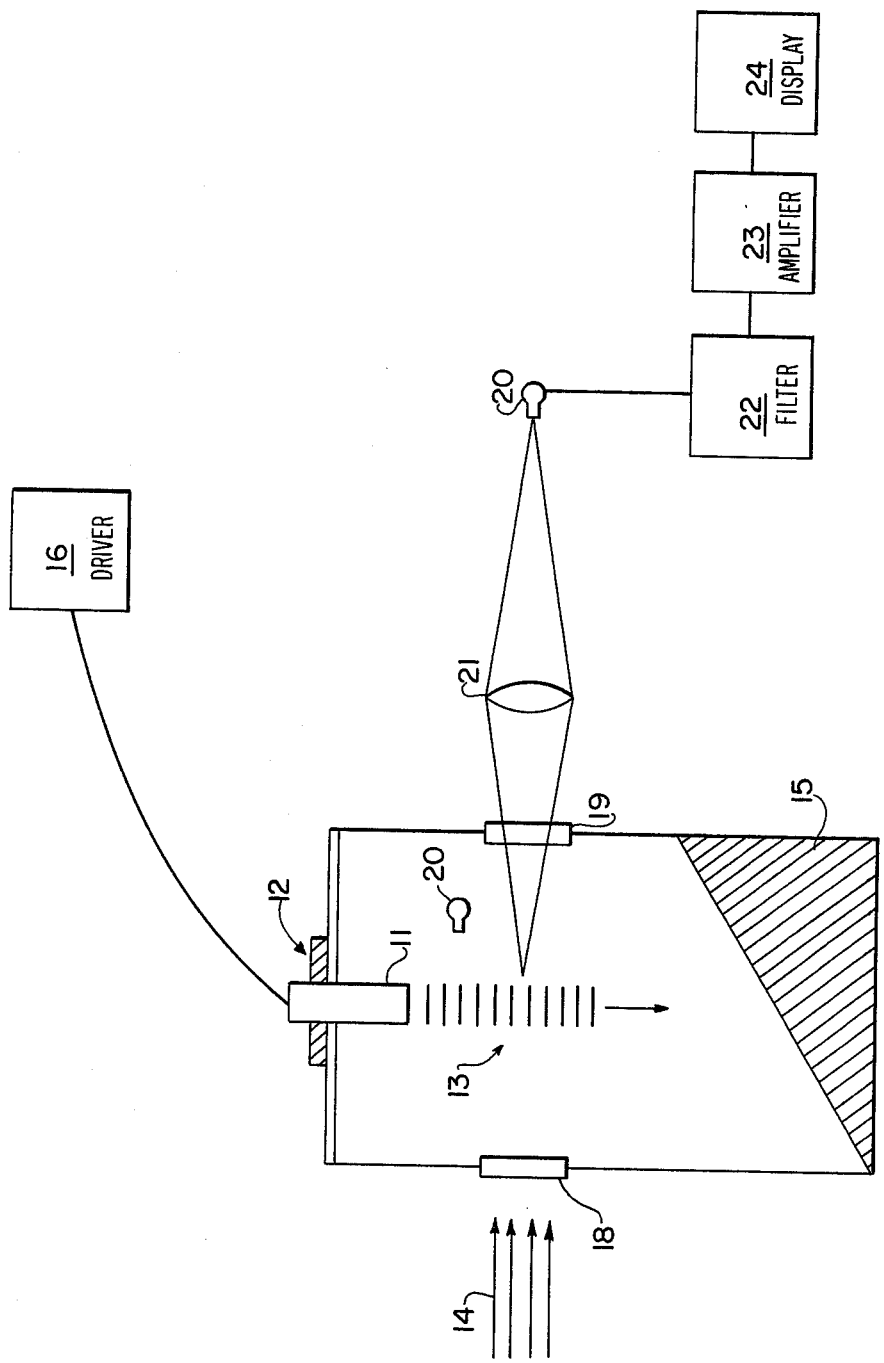

ULTRASONIC TRANSDUCER CALIBRATION

The present invention is directed to an acoustooptical method of measuring the radiation produced by a transducer where such radiation is in the range of about 500 KHz to 10 MHz and an apparatus for accomplishing the same. Fundamentally, this invention addresses the problem where an ultrasonic transducer producing an unknown radiation can be calibrated from basic principles, known constants and easily measured quantities. Furthermore, this invention is particularly adapted to solving the problem where unknown radiation from a first transducer is measured against known radiation from a second transducer and the method is characterized by the following steps:

(a) propagating ultrasound frequencies through a transparent liquid medium in a cell;

(b) passing incident light through said cell at a right angle to the direction of said ultrasound and intersecting said ultrasound and modulating the phase of said light with the frequency of said ultrasound to produce modulated light;

(c) detecting said modulated light by a nearfield fast photodetector to produce a signal representative of said radiation; and (d) filtering, amplifying and measuring said signal.

PRIOR ART

US. Pat. No. 2,623,165 Mueller et al — Here the ultrasonic modulation uses the birefringent properties of solids.

U.S. Pat. No. 3,431,504 Adler — This patent uses farfield and Bragg diffraction which are excluded by the nearfield detector and radiation concept of the present invention. Additionally, the modulation in the patent is that produced by modulating the driving ultrasonic signal.

U.S. Pat. No. 3,812,454 Bhuta et al — This patentee also uses the farfield and Bragg diffraction concepts combined with parametric amplification. An additional contrast from the present invention is that the patentee uses converging light, not parallel light.

U.S. Pat. No. 3,831,135 Smith — Similar to Bhuta et al, ante, but does not embody parametric amplification.

The present invention differs from the above-noted patent references and the method and apparatus fill a niche caused by the growing medical use of ultrasonics for therapeutic and diagnostic purposes. To prevent excessive exposure of human tissue from this form of radiation, there exists a need for a simple system to measure radiation from ultrasonic transducers. The present concept permits the employment of a simple system for ultrasonic transducer calibration which has advantages and capabilities as follows: it is simple to operate, low in cost, capable of large dynamic range in sonic power and frequencies, it is accurate, capable of having a direct electronic readout, and capable to both continuous and pulsed modes of operation of the ultrasonic transducer. Finally, it is easy to calibrate.

BASIC SYSTEM DESCRIPTION

The basic system and apparatus for practicing this invention is described more fully and illustrated in FIG. 1. An ultrasonic transducer 11 being calibrated is held in a mechanical mount 12 which can be adjusted to direct the ultrasonic waves 13 perpendicular or nearly perpendicular to the incident light 14. The ultrasound is propagated in a liquid medium and is absorbed or reflected by an appropriate termination 15 which may be a radiation absorbent block or similar device to insure that the ultrasound does not return along the same path or the vicinity of the same path and give an echo reading. The ultrasonic transducer is driven electrically by standard electronic units 16 for this purpose and the frequency of the operation of the transducer is typically between 500 KHz and 10 MHz.

The light enters and exits the tank containing the liquid medium through transparent windows 18 and 19. A fastresponding photodetector is placed in close proximity to the sound field. For ultrasonic transducers operating at the lower frequencies, the photodetector can be placed outside the window 19. For higher frequencies, the photodetector 20 may be required to be placed inside the tank or imaged inside the tank by means of lens 21.

Calibration of a first transducer of known radiation by this method enables rapid and convenient calibration of unknown transducers by a simple comparison.

ALTERNATIVE METHODS AND DEVICES

In addition to the specific disclosure set out above and related to FIG. 1, the following alternative forms of the method and apparatus are disclosed for practicing this invention. Obviously, all mechanical systems that rotate, translate, and align the transducer to the apparatus are operable, as well as different forms of optical radiation, chromatic as well as monochromatic, coherent or incoherent, in a wavelength or combination of wavelengths.

Relative to the optical detector, a photodetector, photodiode, photomultiplier may be used which is capable of responding to the modulation frequency of light.

Further with respect to the photodetector, different forms of electronic filters and combinations including active or passive, low-, high-, or band-pass which may select any one or any combination of harmonic components of the signal from the photodetector, may be utilized.

Further, different forms of electronic amplifiers, including those with filters and rectifiers and those with fixed or variable gain, may be utilized. Further, it is understood that in practicing this invention the filter and amplifier may be interchanged in position or combined.

Further, with respect to the detector sequence, different forms of electronic detectors and displaying apparatus including voltmeters, AC, DC, and true rms, peak detectors, oscilloscopes, recorders, etc., may be utilized. Also, different forms and combinations of photodetectors and associated electronics that could sum, difference, multiply, divide or otherwise combine the signals from the photo-detectors may be utilized.

With respect to the optical elements, different forms which divert, deflect, focus, and image the light before it enters and after it leaves the sound field, including lens, mirrors, prisms, fiber optics, etc., may be utilized.

Also, different forms of acoustical absorbers and reflectors for absorbing or diverting the acoustical radiation including rubber pads, liquid traps and scatterers may be utilized.

Finally, methods may be utilized for translating the photodetector and associated optics to change the position of the photodetector or its image in all three dimensions.

THE PRINCIPLE OF OPERATION

The principle of operation is based on the fact that the light irradiance is modulated or changed by the ultrasonic field. Since the sound field is moving or progressing, the light pattern at the photodetector is modulated in time. The signal from the photodetector is representative of this time dependence. Thus, in FIG. 1, the signal is filtered by unit 22, amplified by unit 23, and displayed or measured at unit 24. It can be shown that the signal measured at 24 is directly related to the sound power radiated from the transducer.

The fundamental concept of this disclosure is the utilization of the time varying signal from the photodetector placed in close proximity to the sound field to extract sufficient information to calibrate the transducer for isonic power being radiated.

The phenomena associated with light, especially monochromatic light, passing through a clear liquid in a transparent cell are known; Jenkins and White, *Fundamentals of Optics,* 4th Ed., 1976, pages 459–460.

The application of the light principle to sound pressure and sound power measurements are related to the Raman-Nath parameter $v$ given by the following formulae which have to do with the theorem that associated with the sound field is an optical phase grating which moves with the sound.

The magnitude of the optical phase retardation of the light is:

$$v = 2n \, \Delta n \, L/\lambda \tag{1}$$

$$v = 2n \, \eta p \, L/\lambda \tag{2}$$

where $\lambda$ is the optical wavelength in vacuum, $\Delta n$ is the maximum refractive index change induced by the acoustic pressure $p \sin(\Omega t - Kz)$, and $\eta$ is the piezo-optic coefficient. This constant, $v$, was introduced conceptionly by C. V. Raman and N. S. N. Nath.

Equation 1 relates to the Raman-Nath parameter $v$ and pressure. It was previously known that the parameter $v$ was determined from the optical farfield pattern; i.e., from the relative irradiance of the diffraction orders.

As noted, it has been stated that the periodic nearfield pattern moves with a progressing sound field. The irradiance of this pattern can be calculated from the light amplitude distribution $E(y, z, t)$ which satisfies the scalar wave equation $$2_E(\mu^2/c^2)(\delta^2 E/\delta t^2) \tag{3}$$

and, for phase gratings produced by sinusoidal phase gratings, the boundary conditions of $$E = E_o e^{i(\omega t + iv \sin\theta)}, \tag{4}$$

where $$\theta = \Omega t - kz. \tag{5}$$

The results of these calculations for the irradiance $I(y,\theta)$ of the light in the nearfield of the optical grating can be expressed as follows:

$$I(y,\theta) = |E_o|^2 \{1 + 2J_1(\omega_1) \sin\theta - 2J_2(\omega_2)\cos 2\theta - 2J_3(\omega_3)\sin(3\theta) + 2J_4(\omega_4)\cos(4\theta) + \ldots\} \tag{6}$$

where $J\nu$ are the ordinary Bessel functions of the first kind, $$\omega_\nu = 2\nu \sin(\nu\psi/2) \tag{7}$$

$$\psi = (2\pi\lambda/\Lambda^2)(\Sigma_j)(y_j/\mu_j) \tag{8}$$

$\lambda$ is the wavelength of light in a vacuum, $\Lambda$ is the wavelength of the ultrasound in the liquid medium, and $\Sigma(y_j/\mu_j)$ is an optical path correction from the location of the ultrasonically produced phase grating and the photodetector. Specifically, $y_j$ is the path length in an optically transparent medium with refractive index $\mu_j$, and the summation permits calculation of the contribution from the liquid medium, glass windows, air, etc.

Equation 6 can be used for the determination of the parameter V, and consequently the pressure p, from the measured irradiance $I(y,\theta)$ of the light in the nearfield. Since $I(y,\theta)$ is a time-varying light irradiance and these time variations can be converted to an electrical signal by a fast responding photodetector, certain harmonic features as expressed by Equation 6 can be isolated. In particular, let $I_1$ be the fundamental component (1st harmonic) of the time-dependent irradiance. From Equation 6 it is found that $$I_1 = 2I_o J_1(\omega_1) \tag{9}$$

Equation 5 reduces to a linear function of $v$ with the following restriction. First, let $\psi/2$ be small, so that $$\sin(\psi/2) = \psi/2 \tag{10}$$

and secondly, let $v\psi$ be small, so that $$J_1(v\psi) \simeq v\psi/2 \tag{11}$$

With these restrictions it is found that $$I_1 \simeq v \psi I_o \tag{12}$$

Both of these restrictions can be realized by placing the photodetector near the locations of the phase grating. If the physical dimensions of the water tank precludes the placement of the photodetector in this location, the phase grating can be imaged outside the tank with a simple lens and the photodetector placed sufficiently close to the image to keep $\psi$ small.

In practice, one can determine $v$ without an exact knowledge of $\psi$. A known change in $\psi$ is sufficient; and, this can be accomplished by either moving the photodetector or transducer. Note that we can write $$v = (1/I_o)(\Delta I_1/\Delta \psi) \tag{13}$$

and from Equation 8, $$\Delta\psi = (2\pi\lambda/\Lambda^2)(\Delta y/u_j). \tag{14}$$

Assuming that we move the transducer in the direction of light propagation, we will find a fractional change in $I_1$ with respect to $I_0$. Evaluating Equation 14 and substituting into Equation 13, we can determine $v$ absolutely.

In the present invention, utilization of the irradiance of the nearfield of an ultrasonically produced optical grating, coupled with placing the photodetector in close proximity to the sound, has allowed the production of a useful device. This device permits the absolute calibration of the sound output of a transducer and/or the relative output to a known transducer.

I claim:

1. An acousto-optical method of measuring the radiation produced by a transducer in the range of about 500 KHz to 10 MHz and calibrating the same consisting of:
   (a) propagating ultrasound frequencies through a transparent liquid medium in a cell;
   (b) passing incident light through said cell at a right angle to the direction of said ultrasound and intersecting said ultrasound and modulating the phase of said light with the frequency of said ultrasound to produce modulated light;
   (c) detecting said modulated light by a fast photodetector placed in close proximity of the sound field to produce a signal representative of said radiation; and,
   (d) filtering, amplifying and measuring said signal.

2. The method of claim 1 wherein in (d) the signal is measured and displayed.

3. The method of claim 1 wherein unknown radiation from a first transducer is measured against known radiation from a second transducer.

4. The method of claim 1 wherein unknown radiation from a first transducer is measured and calibrated against known constants.

5. The method of claim 1 wherein a transducer of low frequencies is used and said photodetector is located outside the cell.

6. The method of claim 1 wherein a transducer of high frequencies is used and said photodetector is placed in the cell.

7. The method of claim 1 wherein the photodetector is imaged in the cell.

8. An acousto-optical transducer calibrating apparatus consisting essentially of
   (a) a transparent liquid medium filled cell with a transducer mounted on said cell, said transducer capable of emitting ultrasonic waves in the frequency range of about 500 KHz to 10 MHz which will enter and pass through said medium;
   (b) an incident light source which passes through cell at a right angle to the ultrasonic waves and is modulated in phase with said transducer frequency;
   (c) a fast photodetector in close proximity to the ultrasonic waves which senses the frequencies of the modulated light.

9. The apparatus according to claim 8 wherein there is a sound absorbent material provided in the liquid filled cell and positioned opposite the transducer radiations to absorb the ultrasound and prevent an interfering echo signal.

10. The apparatus according to claim 8 wherein said light source is chromatic.

11. The apparatus according to claim 8 wherein said light source is monochromatic.

* * * * *